United States Patent
Nakasugi

(10) Patent No.: US 6,803,589 B2
(45) Date of Patent: Oct. 12, 2004

(54) APPARATUS AND METHOD APPLIED TO EXPOSURE BY CHARGED BEAM

(75) Inventor: Tetsuro Nakasugi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 130 days.

(21) Appl. No.: 09/957,511

(22) Filed: Sep. 21, 2001

(65) Prior Publication Data

US 2002/0036761 A1 Mar. 28, 2002

(30) Foreign Application Priority Data

Sep. 27, 2000 (JP) ........................................ 2000-294313

(51) Int. Cl.[7] .............................. G21K 5/10; H01J 37/08
(52) U.S. Cl. ................................. 250/492.22; 250/492.23
(58) Field of Search ....................... 250/492.22, 492.23, 250/397

(56) References Cited

U.S. PATENT DOCUMENTS

| | | | | |
|---|---|---|---|---|
| 5,404,019 A | * | 4/1995 | Ohno et al. | 250/492.23 |
| 6,300,629 B1 | * | 10/2001 | Lawrence | 250/310 |
| 6,366,341 B1 | * | 4/2002 | Shirato et al. | 355/35 |
| 6,393,604 B1 | * | 5/2002 | Yamada et al. | 716/21 |
| 6,657,211 B2 | * | 12/2003 | Benner | 250/492.22 |

FOREIGN PATENT DOCUMENTS

| | | | | |
|---|---|---|---|---|
| JP | 5-36594 | 2/1993 | ......... | H01L/21/127 |
| JP | 2907527 | 4/1999 | ......... | H01L/21/027 |
| JP | 3008494 | 12/1999 | ......... | H01L/21/022 |

OTHER PUBLICATIONS

Nakasugi, T., "Charge Beam Exposure Apparatus, Charge Beam Exposure Method, And Charge Beam Exposure Mask", U.S. Ser. No.: 09/658,506, Filed: Sep. 8, 2000, Specification—58 pages, and 20 sheets of drawings.

* cited by examiner

Primary Examiner—Stephen D. Meier
Assistant Examiner—Alfred Dudding
(74) Attorney, Agent, or Firm—Finnegan, Henderson, Farabow, Garrett & Dunner, L.L.P.

(57) ABSTRACT

There is disclosed an apparatus applied to exposure by a charged beam, having a pattern information acquiring section acquiring information on a character projection pattern formed in a character projection aperture mask, a first information storing section storing information on a reference pattern, and an identifying section identifying a shape of the character projection pattern by comparing the information on the character projection pattern with the information on the reference pattern.

15 Claims, 19 Drawing Sheets

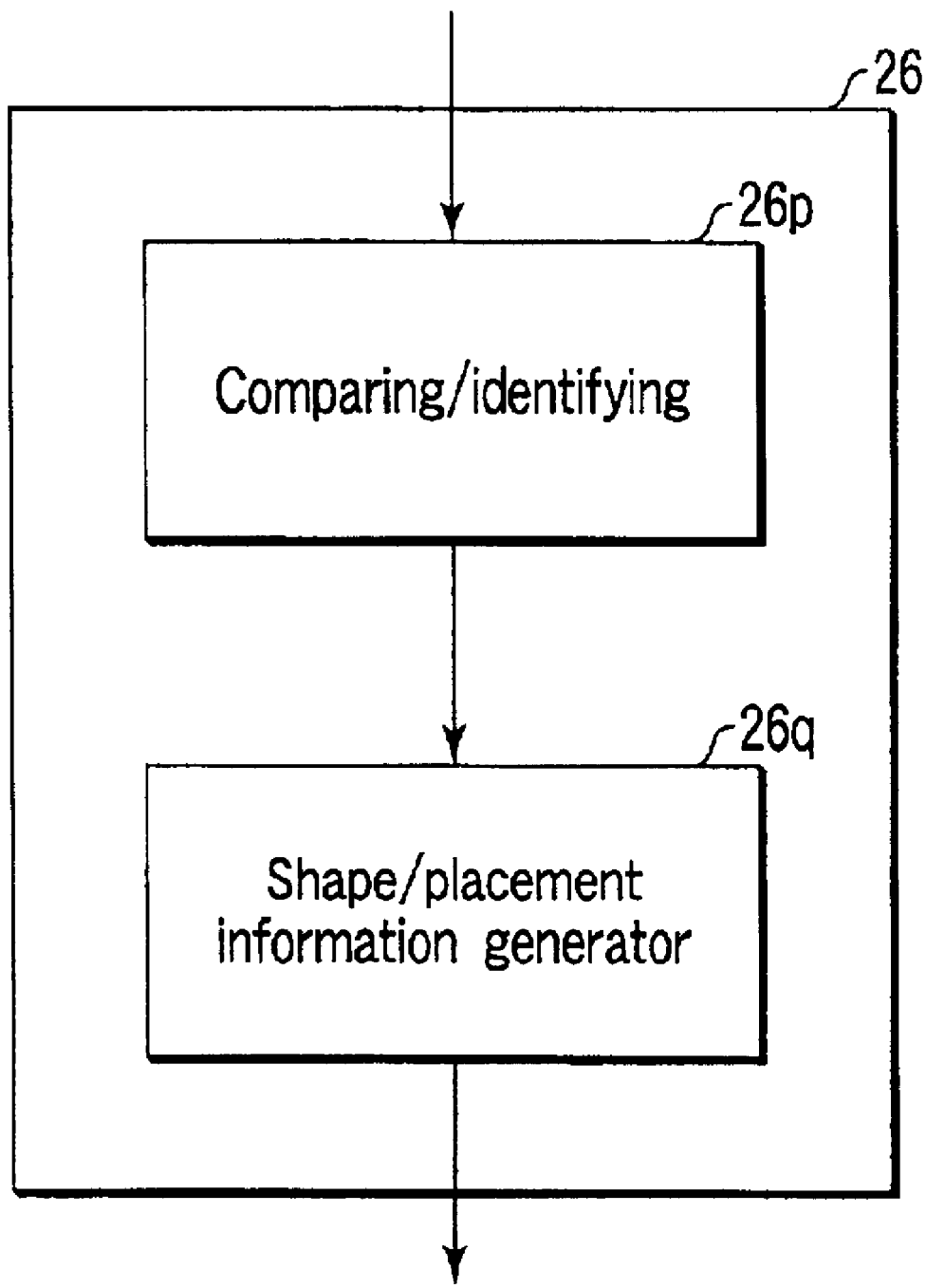
F I G. 2D

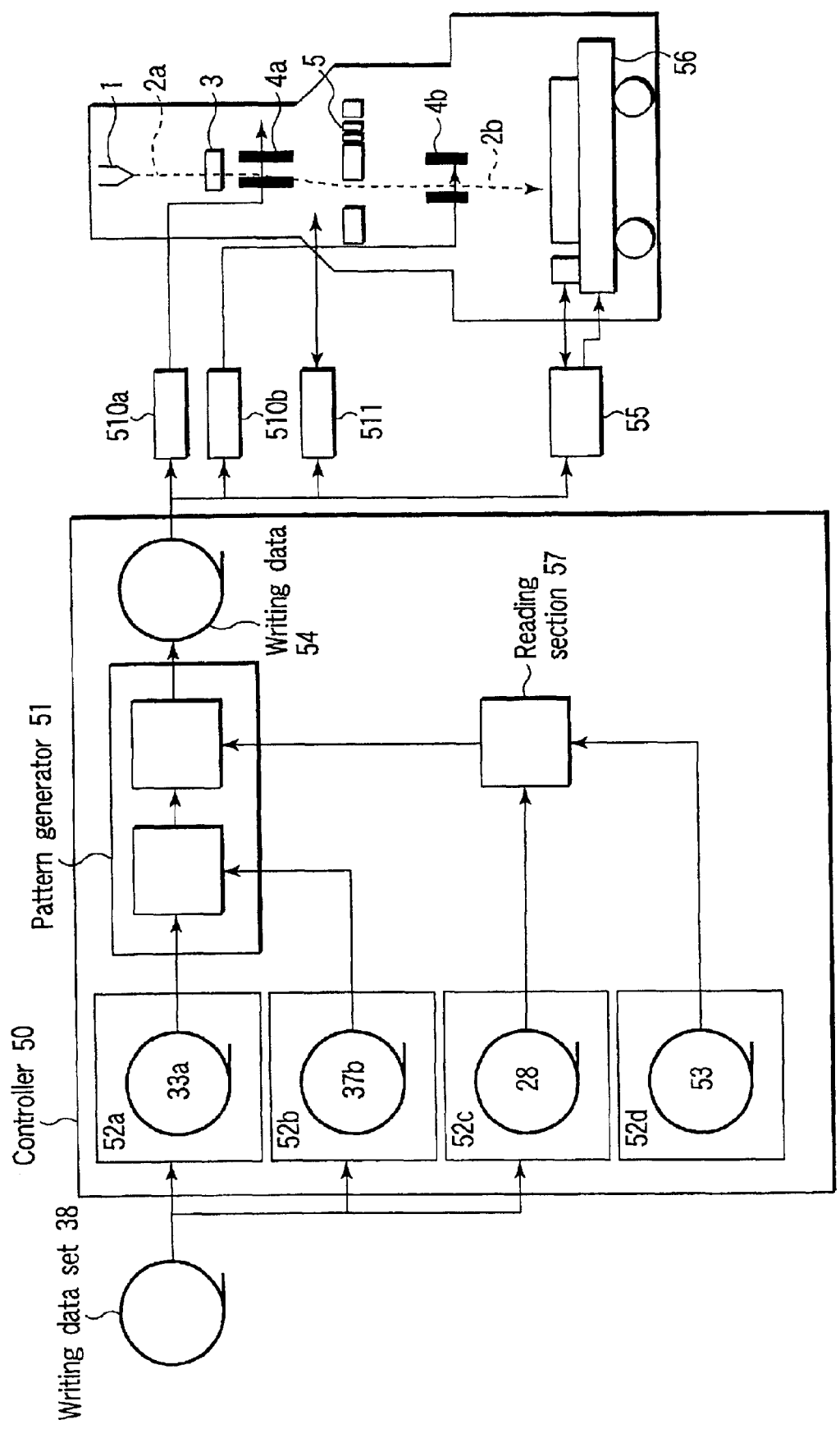
F I G. 5

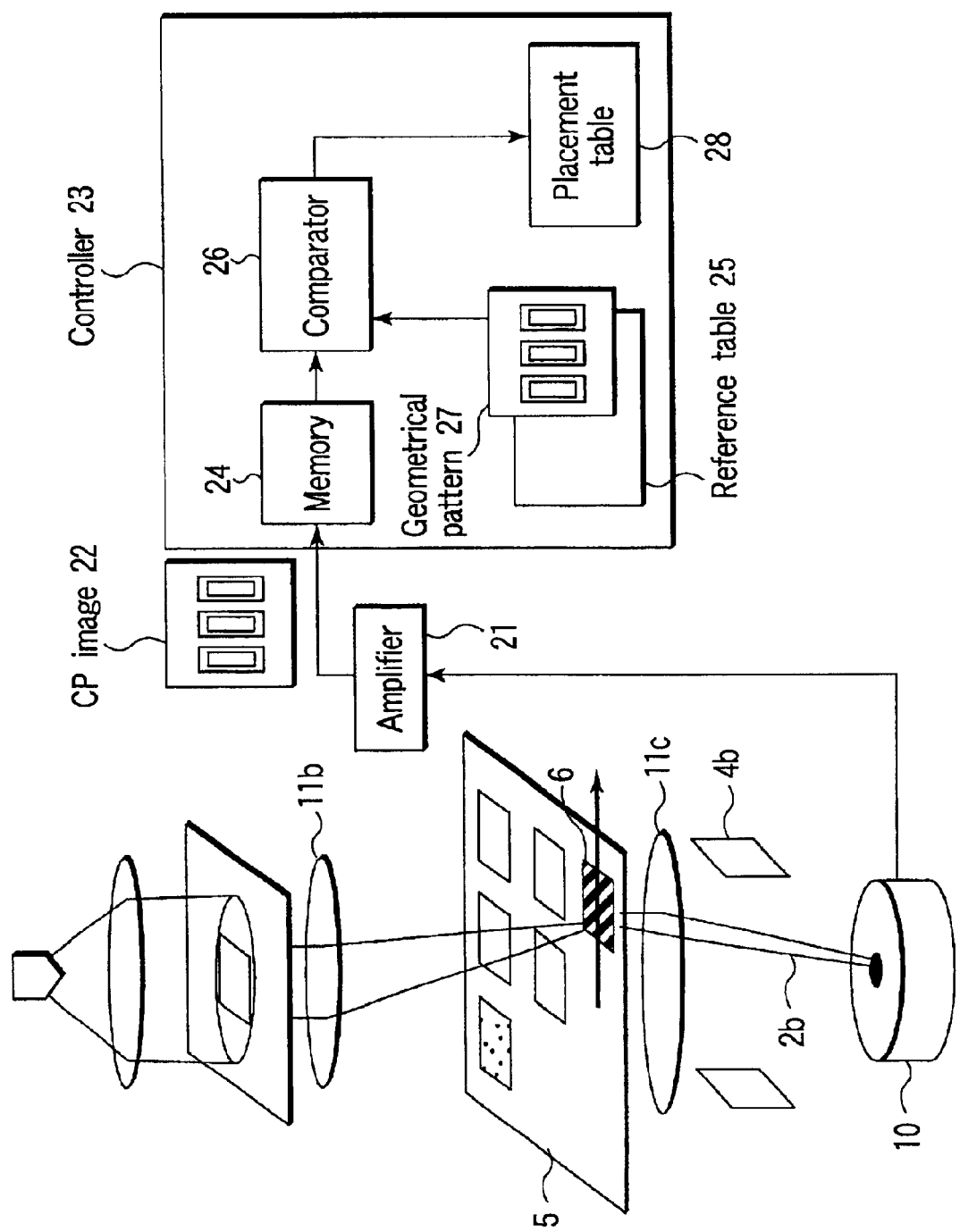
F I G. 6

APPARATUS AND METHOD APPLIED TO EXPOSURE BY CHARGED BEAM

CROSS-REFERENCE TO RELATED APPLICATIONS

This application is based upon and claims the benefit of priority from the prior Japanese Patent Application No. 2000-294313, filed on Sep. 27, 2000, the entire contents of which are incorporated herein by reference.

BACKGROUND OF THE INVENTION

1. Field of the Invention

The present invention relates to an apparatus and a method which are applied to exposure by a charged beam.

2. Description of the Related Art

Electron beam exposure of a character projection (CP) system is a method of forming an about several micrometers character projection (CP) pattern in a second aperture mask, and using the character projection pattern to perform exposure. The character projection (CP) system is regarded as promising means for enhancing throughput in the electron beam exposure.

Usually, the number of character projection patterns (CP pattern number) is about five. A conventional operation for preparing a table regarding shape and placement of the CP pattern is performed by operator's manual input.

However, the CP pattern number tends to increase in order to enhance the throughput of an electron beam exposure apparatus. When the number of types of CP patterns exceeds 100, it is remarkably intricate to perform the table preparing operation by the operator's manual input. Moreover, time required for the operation, failure of exposure by operator's input mistake, and the like remarkably deteriorate productivity in the electron beam exposure.

On the other hand, since thickness of a substrate with the CP pattern formed thereon is as small as about several micrometers, a defect, and the like are possibly generated in the CP pattern during handling. When the pattern having the defect is used to perform the exposure, a pattern different from a desired pattern is transferred onto a wafer. Therefore, productivity in the electron beam exposure is remarkably deteriorated.

As described above, the preparing operation of the table regarding the CP pattern has heretofore been performed by the operator's manual input. This is a factor remarkably deteriorating the productivity in the electron beam exposure and another charged beam exposure.

Moreover, when the CP pattern having the defect is used to perform the exposure, a target pattern cannot be obtained. This is also a factor remarkably deteriorating the productivity in the charged beam exposure.

BRIEF SUMMARY OF THE INVENTION

According to a first aspect of the present invention, there is provided an apparatus applied to exposure by a charged beam, comprising: a pattern information acquiring section acquiring information on a character projection pattern formed in a character projection aperture mask; a first information storing section storing information on a reference pattern; and an identifying section identifying a shape of the character projection pattern by comparing the information on the character projection pattern with the information on the reference pattern.

According to a second aspect of the present invention, there is provided a method applied to exposure by a charged beam, comprising acquiring information on a character projection pattern formed in a character projection aperture mask; and identifying a shape of the character projection pattern by comparing the information on the character projection pattern with information on a reference pattern.

BRIEF DESCRIPTION OF THE SEVERAL VIEWS OF THE DRAWING

FIGS. 2A to 2D are explanatory views of an exposure apparatus according to the first embodiment of the present invention.

FIG. 5 is an explanatory view of an exposure function of the exposure apparatus according to the first embodiment of the present invention.

FIG. 6 is an explanatory view of the exposure apparatus according to a second embodiment of the present invention.

DETAILED DESCRIPTION OF THE INVENTION

Embodiments of the present invention will be described hereinafter with reference to the drawings.

(First Embodiment)

Figure 1:
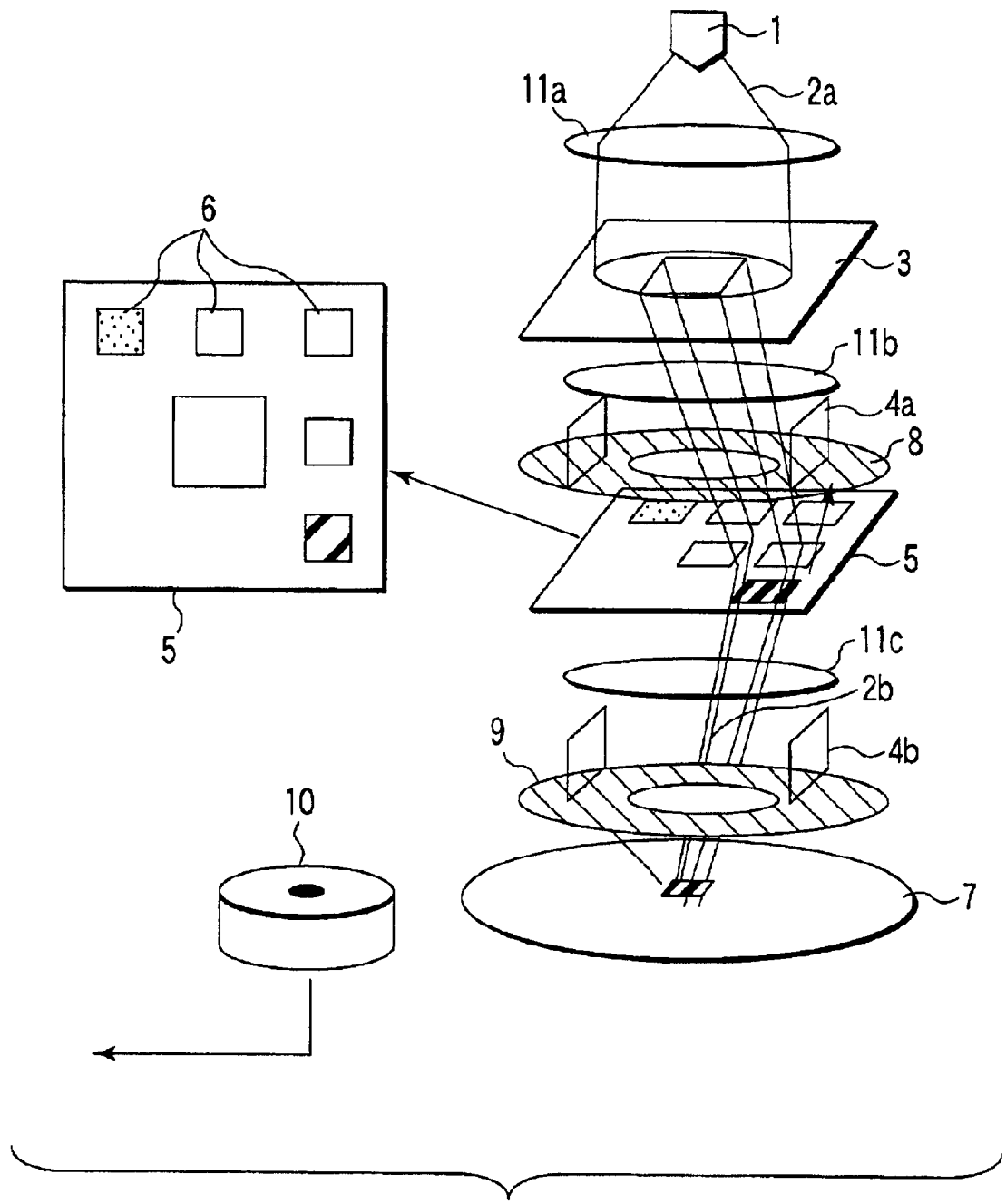
FIG. 1 is an explanatory view of a schematic constitution of an exposure apparatus main body according to a first embodiment of the present invention.

FIG. 1 is a diagram showing a schematic constitution of an exposure apparatus according to a first embodiment. This apparatus is an electron beam exposure apparatus of a character projection (CP) system, and an acceleration voltage is 50 kV.

An electron beam 2a generated from an electron gun 1 is transmitted through a first aperture mask 3, and a second aperture mask (character projection aperture mask) 5 is irradiated with the electron beam by a deflector 4a. A character projection pattern (CP pattern, aperture pattern in the character projection aperture mask) 6 as a hole pattern is disposed in the second aperture mask. An electron beam 2b transmitted through the CP pattern 6 is reduced and projected onto a wafer 7 by a lens system. A reduction ratio of the apparatus is 1/10, and a maximum beam size on the wafer is 5 µm.

An intermediate detector 8 is disposed above the second aperture mask 5. The intermediate detector can detect a reflection electron and secondary electron reflected by the second aperture mask 5. Moreover, a detector 9 is disposed above a sample (wafer 7). The detector 9 detects the reflection and secondary electrons reflected by the sample. Furthermore, a Faraday cup 10 disposed substantially on the same plane as a sample surface detects a current of the electron beam 2b transmitted through the CP pattern 6.

A method of using the intermediate detector 8 will be described hereinafter as a method of obtaining the shape of the CP pattern. A lens 11b is used to focus the electron beam 2a on the second aperture mask 5. When the intermediate detector 8 detects the reflection and secondary electrons from the second aperture mask 5 in this state, an image of the CP pattern 6 can be acquired.

In the present apparatus, a reference table of a geometrical pattern (CP pattern 6) is prepared beforehand. Moreover, when the shape of the CP pattern obtained by beam scan is compared with the CP pattern in the reference table, the CP pattern is identified. This function will be described below with reference to FIGS. 2A to 2D.

Figures 2A, 2B, 2C:
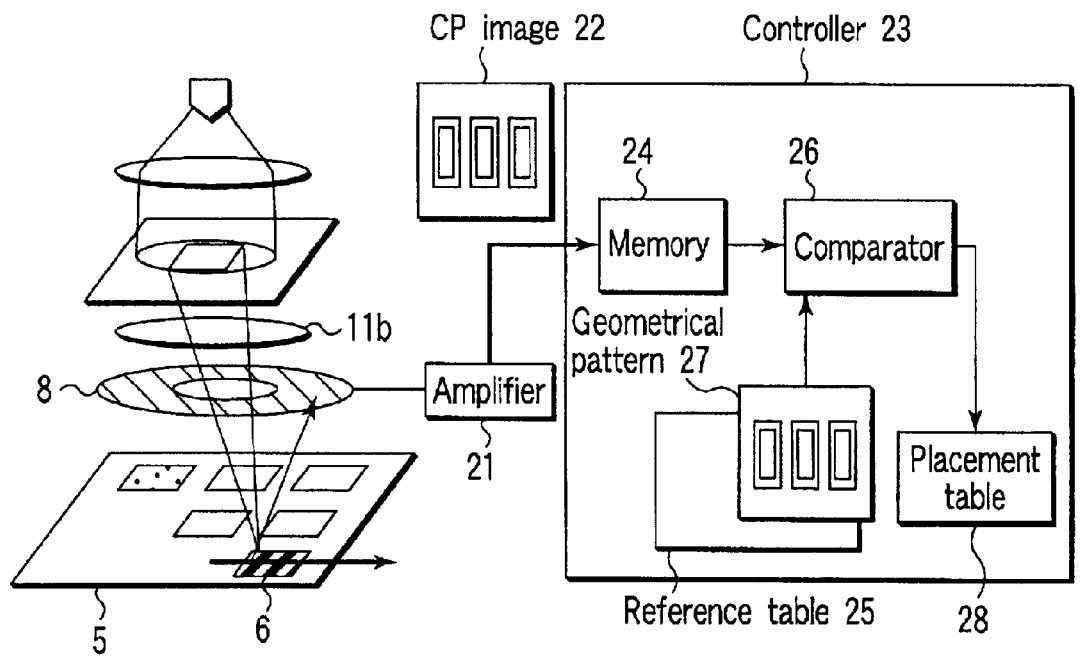

First, as shown in FIG. 2A, the lens 11b is used to focus the beam on the second aperture mask 5. Subsequently, the beam is scanned on the CP pattern 6, and the reflection and secondary electrons from the second aperture mask 5 are detected by the intermediate detector 8. A detection signal is stored in a memory 24 in a controller (controlling section) 23 via an amplifier 21, and a CP image 22 corresponding to the CP pattern 6 is obtained.

As shown in FIG. 2B, a reference table 25 is prepared beforehand in the controller 23. The reference table 25 is managed with a basic geometrical pattern and the corresponding identification number (ID0). Here, the respective geometrical patterns for respective ID0 (1 to n) are written as gradation data of 512×512 pixels.

Subsequently, the CP image 22 stored in the memory 24 is sent to a comparator (comparing section) 26, and a geometrical pattern 27 is also sent to the comparator 26 from the reference table 25. When the geometrical pattern 27 is compared with the CP image 22 by pattern matching in the comparator 26, the shape of the CP pattern 6 is identified (recognized). Moreover, placement of the CP pattern 6 in the second aperture mask is also recognized. Furthermore, information on the shape and placement of the CP pattern 6 is stored in a placement table 28. FIG. 2D is a diagram schematically showing the function of the comparator 26. That is, when the geometrical pattern 27 is compared with the CP image 22 in a comparing/identifying section 26p, the shape of the CP pattern 6 is identified. The information on the shape and placement of the character projection pattern is generated by a shape/placement information generator 26q based on the identification result, and the like.

As shown in FIG. 2C, a CP placement coordinate indicating a position of each CP pattern 6 in the second aperture mask 5, identification number ID1 of the CP placement coordinate, identification number ID0 corresponding to the basic geometrical pattern, and CP image are written in the placement table 28.

Figure 3:
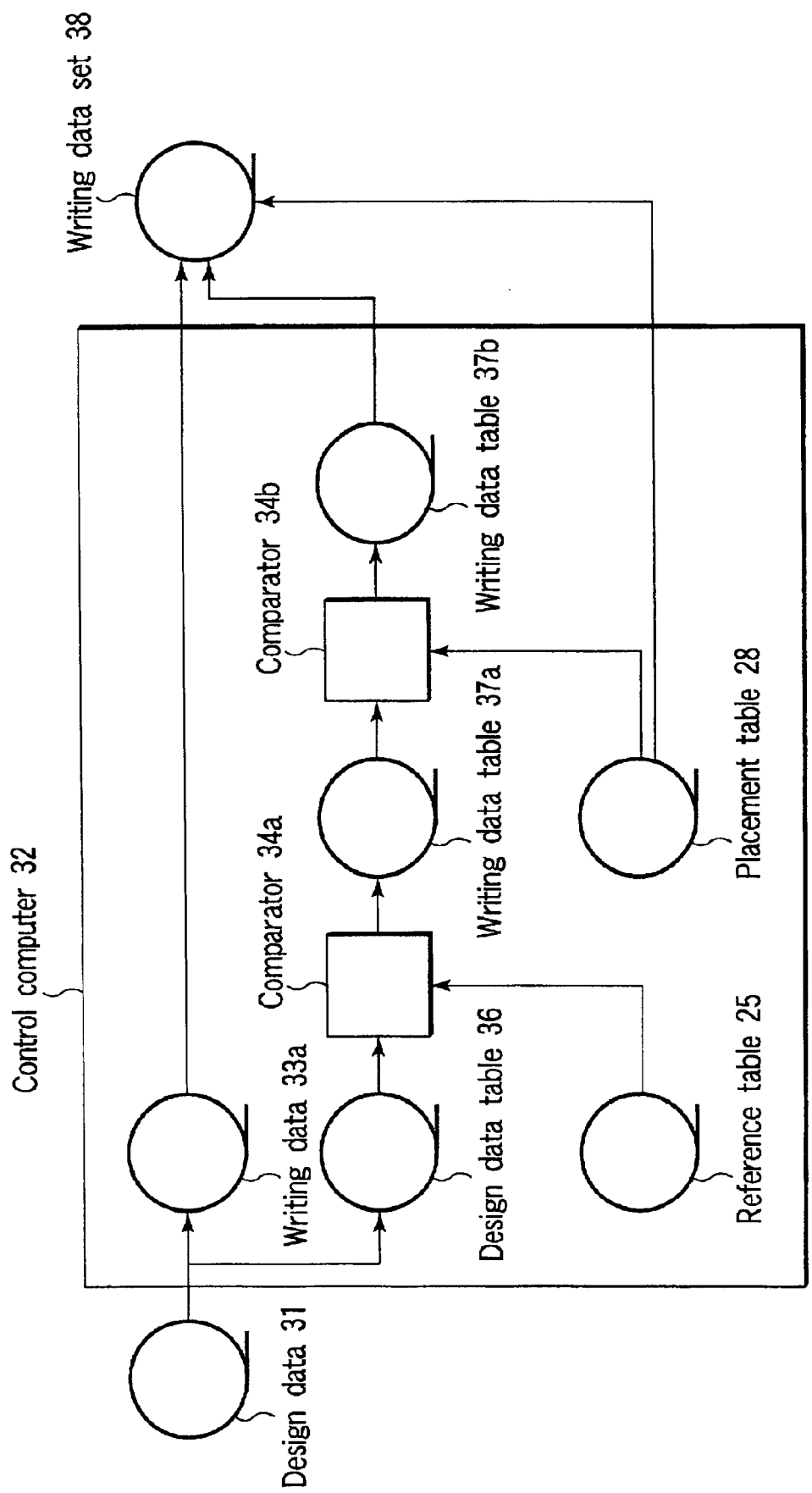
FIG. 3 is a diagram showing a writing data preparing function of the exposure apparatus according to the first embodiment of the present invention.
Figure 4:
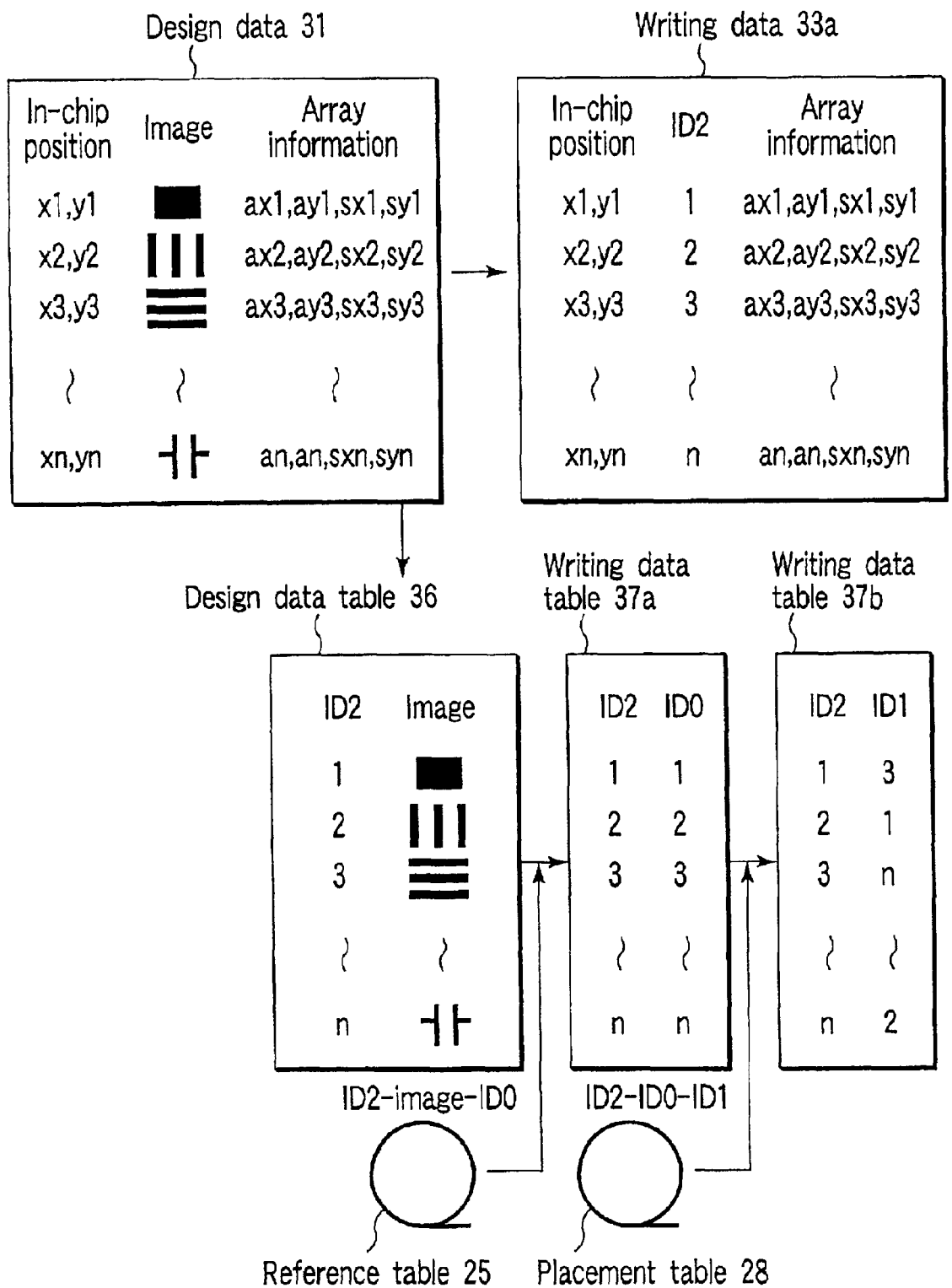
FIG. 4 is a diagram showing a flow of data preparation in the exposure apparatus according to the first embodiment of the present invention.

A function of using the CP placement table 28 to prepare exposure data will next be described with reference to FIGS. 3 and 4.

First, LSI design data 31 is inputted to a control computer 32. The design data 31 is constituted as a set of the basic geometrical patterns written in the reference table 25.

The design data 31 is converted to writing data 33a. In this case, while the basic geometrical pattern and array placement of the design data are held, the data conversion is performed. During the data conversion, identification number ID2 is attached to each basic geometrical pattern, and ID2 and geometrical pattern information are stored as a design data table 36 on the memory. This writing data is constituted of the ID2 of the basic geometrical pattern, and placement information in each geometrical pattern in the chip. The information of the prepared design data table 36 is sent to a comparator 34a.

The comparator 34a reads the basic geometrical pattern of the second aperture mask corresponding to the ID2 of the design data table 36 from the reference table 25 via image data, and stores the pattern as a writing data table 37a in the memory. The ID2 and corresponding information of ID0 are written in the writing data table 37a. Furthermore, a comparator 34b reads CP placement information corresponding to ID0 in the writing data table 37a from the placement table 28 via ID0, and stores the information as a writing data table 37b in the memory. The prepared writing data table 37b together with the writing data 33a and CP placement table 28 are stored as a writing data set 38.

A writing method using the writing data set 38 prepared by the aforementioned procedure will be described hereinafter with reference to FIG. 5.

The writing data set 38 from the control computer is divided into the writing data 33a, writing data table 37b and CP placement table 28, and sent to a controller 50. These writing data 33a, writing data table 37b and CP placement table 28 are stored in memories 52a, 52b, 52c, respectively.

The writing data 33a sent to a pattern generator 51 is formed of the identification number ID2 of CP, information of a CP deflection amount and information of a writing position on the sample. For the pattern generator 51, CP placement ID1 corresponding to ID2 is read from the CP placement table 28, and CP deflection amount data corresponding to CP placement ID1 is read from a deflection parameter table 53 by a reading section 57. In the deflection parameter table 53, the deflection amount data (deflection amount data of the CP deflector 4a) of each CP pattern in the second aperture mask, focus position on a sample surface, astigmatic information, and the like are written.

Writing data 54 obtained by the pattern generator 51 is sent to deflection amplifier controllers 510a and 510b, lens controller 511, controller 55 of a stage 56, and the like. Furthermore, exposure is performed based on signals from the respective controllers.

As described above, according to the embodiment, the information on the character projection pattern of the second aperture mask is compared with the information on the reference pattern of the reference table, and the shape of the character projection pattern is identified, so that productivity in charged beam exposure can be enhanced. Moreover, the information on the shape and placement of the character projection pattern is generated based on the identification result. Therefore, even when the number of types of CP patterns exceeds 100, an operation of preparing the table regarding the character projection pattern can be automated. Consequently, a time of a data input operation by an operator can be reduced, operator's data input mistake can be prevented, and productivity in electron beam exposure or another charged beam exposure can be enhanced.

(Second Embodiment)

In the first embodiment, the intermediate detector 8 is used as means for obtaining the shape of the CP pattern, in a second embodiment, the Faraday cup 10 is used. A method using the Faraday cup will be described with reference to FIG. 6.

First, the lens 11b is used to focus the beam on the second aperture mask 5, and the beam is scanned on the CP pattern 6. The Faraday cup 10 positioned in a center of a deflection area of the electron beam exposure apparatus is irradiated with electron beam transmitted through the CP pattern 6 by a lens 11c and deflector 4b. The electron beam 2b is detected by the Faraday cup 10. The detection signal is stored in the memory 24 in the controller 23 through the amplifier 21, and the CP image 22 corresponding to the CP pattern 6 is obtained.

The subsequent operation in the controller 23 is similar to that of the first embodiment. Moreover, a function of preparing the exposure data (see FIGS. 3, 4) and a writing function (see FIG. 5) are similar to those of the first embodiment.

Also in the second embodiment, similarly as the first embodiment, the table preparing operation can be automated, and the productivity in the electron beam exposure can remarkably be enhanced.

(Third Embodiment)

Figure 7:
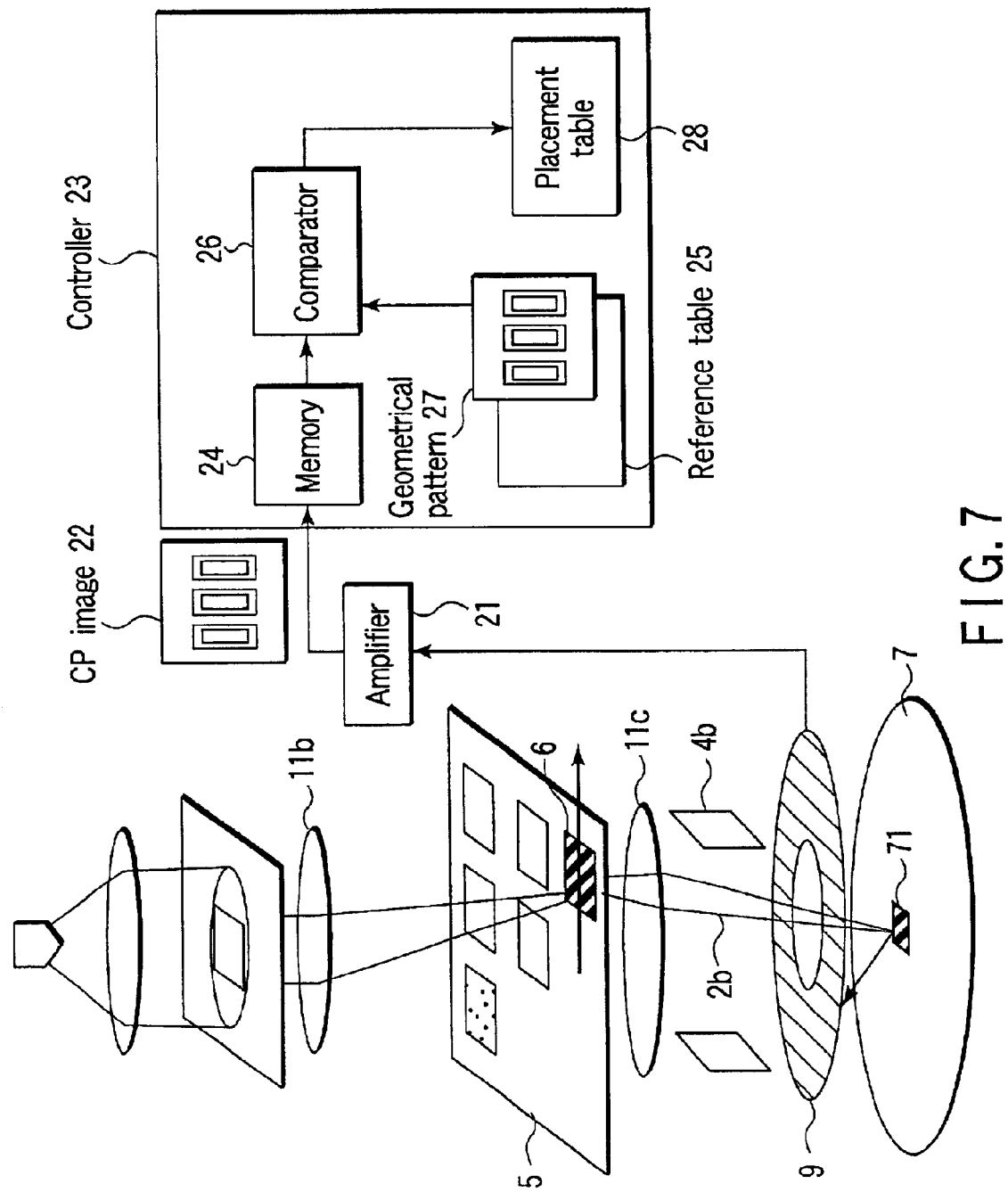
FIG. 7 is an explanatory view of the exposure apparatus according to a third embodiment of the present invention.

In the first embodiment, the intermediate detector 8 is used as the means for obtaining the shape of the CP pattern, but in the method of a third embodiment, the detector 9 disposed above the sample is used. The third embodiment will be described with reference to FIG. 7.

First, the lens 11b is used to focus the beam on the second aperture mask 5, and the beam is scanned on the CP pattern 6. A mark 71 formed on the wafer 7 is irradiated with electron beam transmitted through the CP pattern 6 by the lens 11c and deflector 4b. The detector 9 detects the secondary and reflection electrons from the mark 71. The detection signal is stored in the memory 24 in the controller 23 through the amplifier 21, and the CP image 22 corresponding to the CP pattern 6 is obtained.

The subsequent operation in the controller 23 is similar to that of the first embodiment. Moreover, the function of preparing the exposure data (see FIGS. 3, 4) and writing function (see FIG. 5) are similar to those of the first embodiment.

Also in the third embodiment, similarly as the first embodiment, the table preparing operation can be automated, and the productivity in the electron beam exposure can remarkably be enhanced.

(Fourth Embodiment)

Figure 8A:
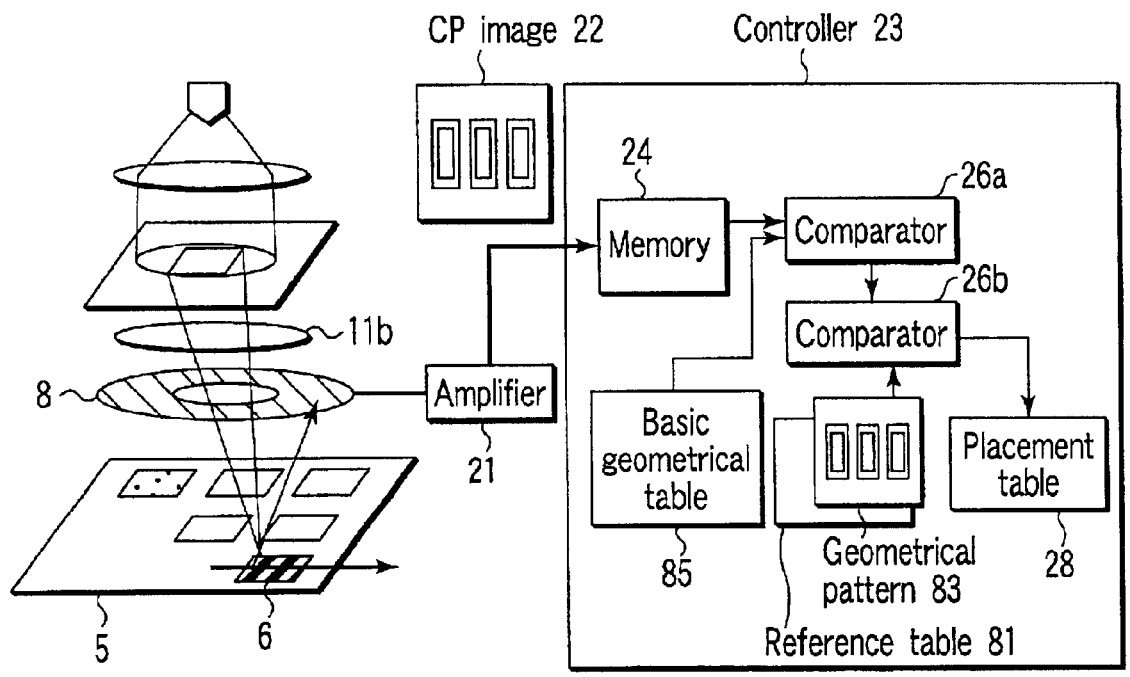
FIGS. 8A to 8C are explanatory views of the exposure apparatus according to a fourth embodiment of the present invention.

In the first embodiment the gradation data of 512×512 pixels is used as the data of the geometrical pattern in the reference table 25, while in a fourth embodiment the geometrical pattern of the reference table is written as a set of basic geometrical patterns such as a triangle, rectangle, trapezoid, and circle. The fourth embodiment will be described hereinafter with reference to FIGS. 8A to 8C.

A geometrical pattern 83 is registered as a combination of basic geometrical patterns. Identification numbers ID are attached to basic geometrical patterns 82, such as 00 to a large-area rectangle, 01 to a vertical rectangle, 02 to a lateral rectangle, and 03 to a triangle. These are written in a basic geometrical table 85 (see FIG. 8C). The information of the geometrical pattern 83 is written as a set of basic geometrical patterns 82 in a reference table 81 (see FIG. 8B).

A function of preparing the placement table 28 in the fourth embodiment (see FIG. 8A) will be described hereinafter.

First, the lens 11b is used to focus the beam on the second aperture mask 5. Subsequently, the beam is scanned on the CP pattern 6, and the reflection and secondary electrons from the second aperture mask 5 are detected by the intermediate detector 8. The detection signal is stored in the memory 24 in the controller 23 through the amplifier 21, and the CP image 22 corresponding to the CP pattern 6 is obtained.

Figures 8B, 8C:
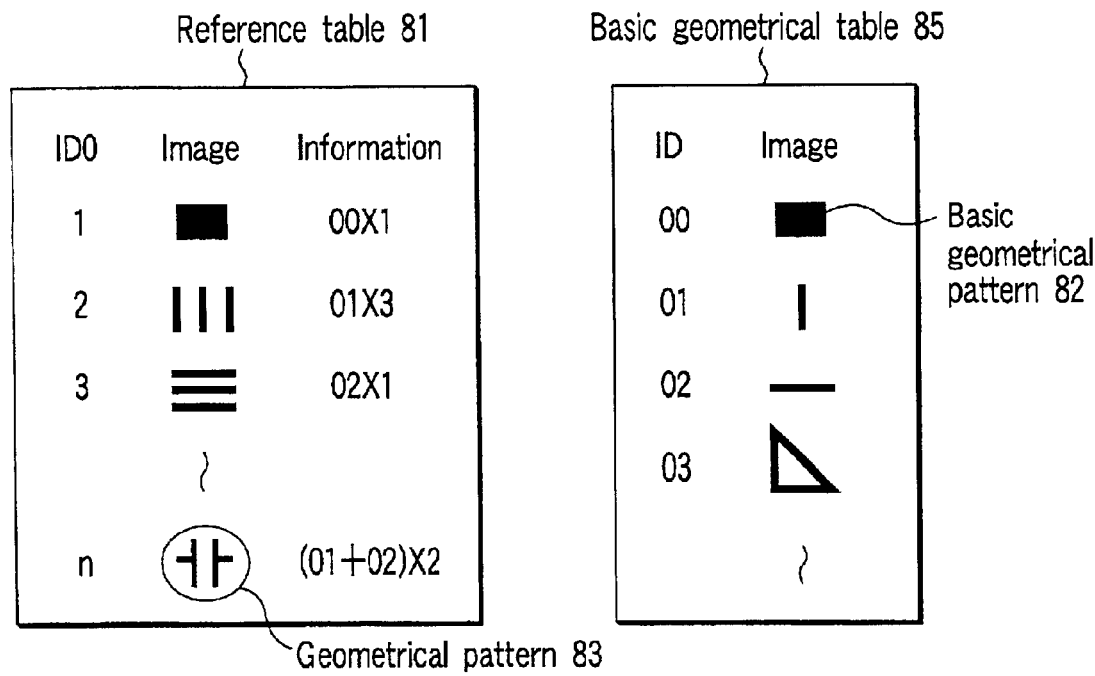

As shown in FIG. 8B, the reference table 81 is prepared beforehand in the controller 23. The reference table 81 is managed by the geometrical pattern 83, corresponding identification number (ID0), and basic geometrical placement information.

Subsequently, the CP image 22 stored in the memory 24 is sent to a comparator 26a, and the basic geometrical pattern 82 is sent to the comparator 26a from the basic geometrical table 85. The comparator 26a compares the CP image 22 with the basic geometrical pattern 82. The CP image 22 is rewritten into set information of the basic geometrical pattern 82.

Thereafter, the geometrical pattern 83 is sent to a comparator 26b from the reference table 81. The comparator 26b compares the geometrical pattern 83 with the CP image rewritten in the set information of the basic geometrical pattern by pattern matching. Furthermore, the placement table 28 is prepared based on the comparison result in the comparator 26b.

Also in the fourth embodiment, similarly as the first embodiment, the table preparing operation can be automated, and the productivity in the electron beam exposure can remarkably be enhanced.

(Fifth Embodiment)

In the first embodiment the gradation data of 512×512 pixels is used as the data of the geometrical pattern in the reference table 25, while in a fifth embodiment the geometrical pattern of the reference table is written in a form including a vertex coordinate of a polygon. The fifth embodiment will be described hereinafter with reference to FIGS. 9A and 9B.

A geometrical pattern 93 is written with the number of vertexes of the polygon and the total number of geometrical patterns. Concretely, the information of the geometrical pattern 93 is written with the number of vertexes of a basic geometrical pattern 92 and the number of basic geometrical patterns in the geometrical pattern 93 (see FIG. 9B).

The function of preparing the placement table 28 in the fifth embodiment (see FIG. 9A) will be described hereinafter.

First, the lens 11b is used to focus the beam on the second aperture mask 5. Subsequently, the beam is scanned on the CP pattern 6, and the reflection and secondary electrons from the second aperture mask 5 are detected by the intermediate detector 8. The detection signal is stored in the memory 24 in the controller 23 through the amplifier 21, and the CP image 22 corresponding to the CP pattern 6 is obtained.

Figures 9A, 9B:
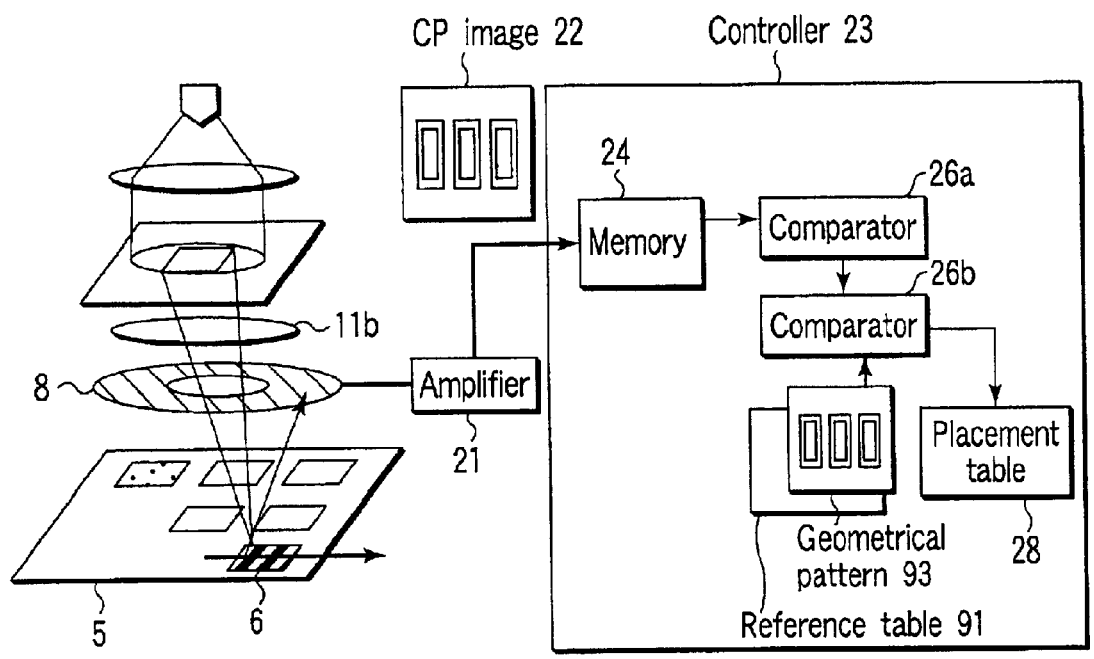
FIGS. 9A and 9B are explanatory views of the exposure apparatus according to a fifth embodiment of the present invention.

As shown in FIG. 9B, a reference table 91 is prepared beforehand in the controller 23. The reference table 91 is managed by the geometrical pattern 93, corresponding identification number (ID0), and basic geometrical placement information.

Subsequently, the CP image 22 stored in the memory 24 is sent to the comparator 26a, and rewritten into the information of the number of basic geometrical patterns and the number of vertexes of each basic geometrical pattern.

Subsequently, the geometrical pattern 93 is sent to the comparator 26b from the reference table 91. The comparator 26b compares the geometrical pattern 93 with the CP image rewritten into the information of the number of basic geometrical patters and the number of vertexes of each basic geometrical pattern by the pattern matching. Furthermore, the placement table 28 is prepared based on the comparison result in the comparator 26b.

Also in the fifth embodiment, similarly as the first embodiment, the table preparing operation can be automated, and the productivity in the electron beam exposure can remarkably be enhanced.

Additionally, in the fifth embodiment, the geometrical pattern is written with the number of geometrical patterns and the number of vertexes of each geometrical pattern, but another method may be used. For example, the geometrical pattern of the reference table is written in the form including the vertex coordinates of the polygon, and the vertex coordinate may be written with a vector from a reference coordinate. Moreover, as the form of the reference table, the geometrical pattern may be written as the set of geometrical patterns which has a partial function of an element.

(Sixth Embodiment)

In a sixth embodiment, the beam is scanned on the CP pattern by a predetermined beam shape and beam scan method. This function will be described.

The function of preparing the placement table 28 in the sixth embodiment will be described hereinafter with reference to FIGS. 10A to 10D.

Figure 10A:
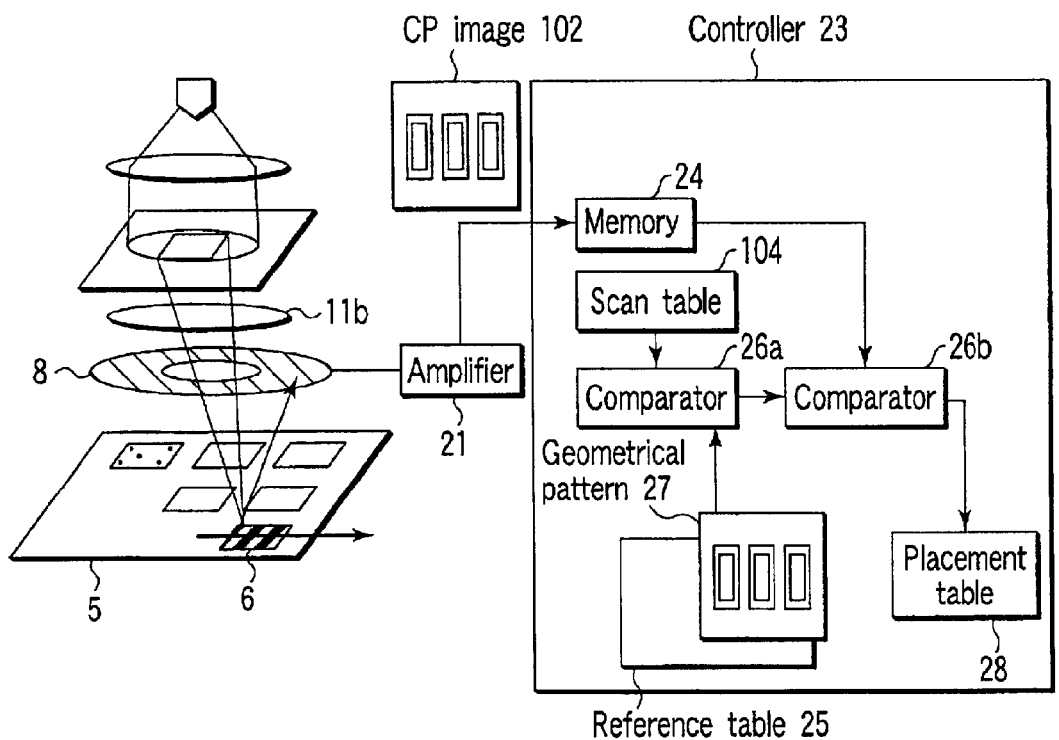
FIGS. 10A to 10D are explanatory views of the exposure apparatus according to a sixth embodiment of the present invention.
Figure 10B:
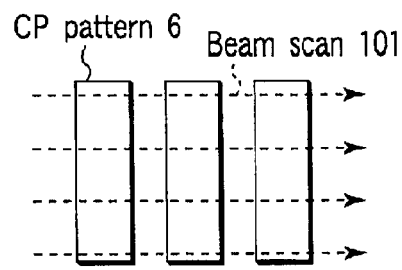
Figure 10C:
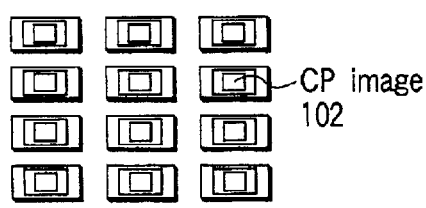
Figure 10D:
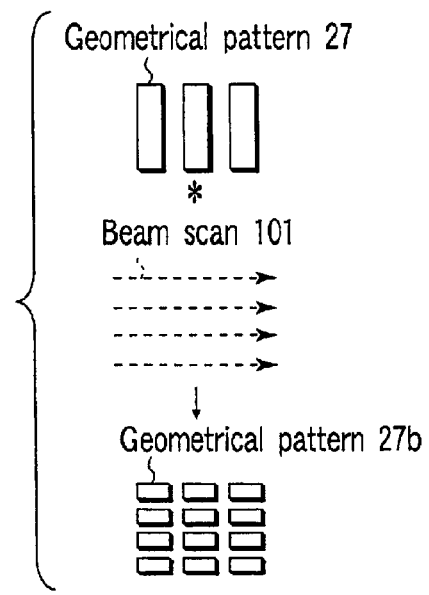

The sixth embodiment is similar to the other embodiments in that the lens 11b is used to focus the beam on the second aperture mask 5. In the sixth embodiment, beam scan on the CP pattern 6 is performed as shown in FIGS. 10B to 10D.

Figure 11A:
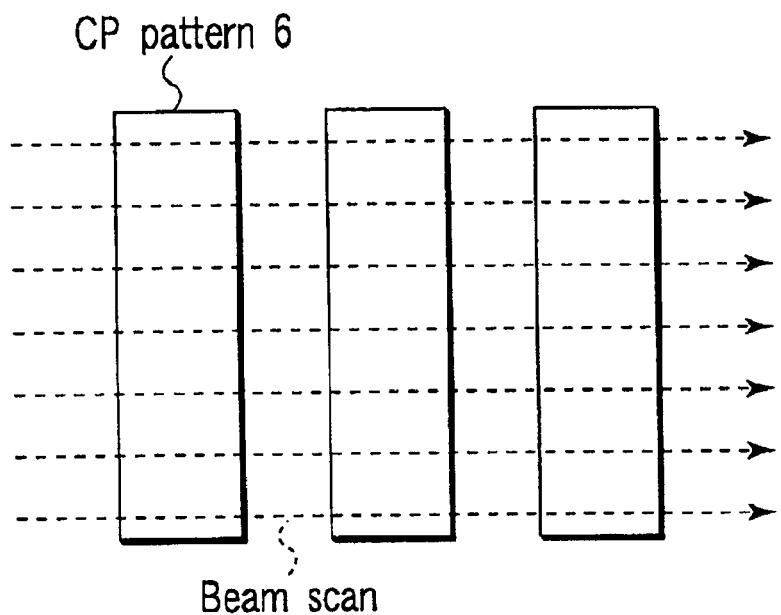
FIGS. 11A and 11B are diagrams showing a beam scan method in the exposure apparatus according to the first embodiment of the present invention.
Figure 11B:
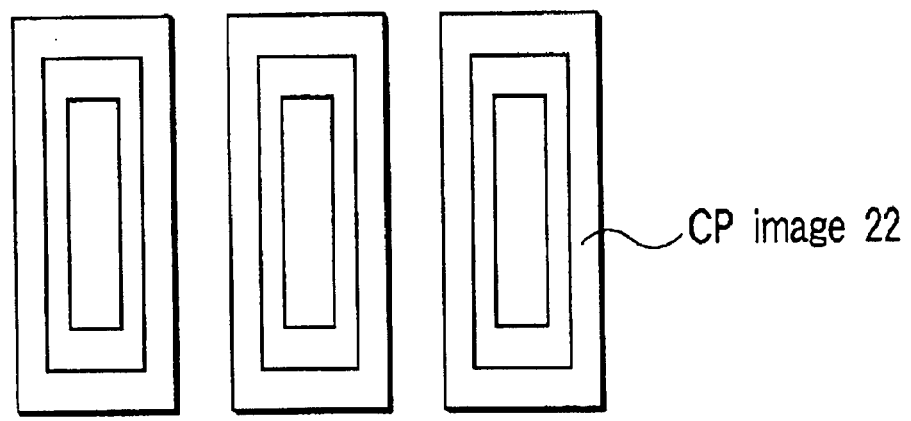

First, the lens 11b is used to focus the beam on the second aperture mask 5, and the beam is scanned on the CP pattern 6. In the sixth embodiment, as shown in FIG. 10B, beam scan 101 on the CP pattern 6 is thinned out and performed. As a result, the detection signal of the intermediate detector 8 is passed through the amplifier 21 and stored in the memory 24 in the controller 23, and a CP image 102 is obtained as shown in FIG. 10C. Additionally, for comparison, an example of performing the beam scan without thinning out is shown in FIGS. 11A and 11B with respect to the exposure apparatus of the first embodiment.

The reference table 25 is prepared beforehand in the controller 23. The reference table 25 is managed by the geometrical pattern 27, corresponding identification number (ID0), and basic geometrical placement information. Moreover, a scan table 104 with an order of beam scan written therein is disposed in the controller 23. The beam scan order is written as bit map information of 512×512 pixels in the scan table 104.

The geometrical pattern 27 is sent to the comparator 26a from the reference table 25, and beam scan information is sent to the comparator 26a from the scan table 104. The comparator 26a performs overlapping calculation of the beam scan information and geometrical pattern. As a result, as shown in FIG. 10D, a geometrical pattern 27b is obtained. The geometrical pattern 27b and CP image 102 are sent to the comparator 26b, and the comparator 26b identifies the pattern by pattern matching. Furthermore, the CP placement table 28 is prepared based on the identification result.

Also in the sixth embodiment, similarly as the first embodiment, the table preparing operation can be automated, and the productivity in the electron beam exposure can remarkably be enhanced.

Additionally, in the sixth embodiment, the geometrical pattern is written in the bit map form, but another method may be used. For example, the geometrical pattern of the reference table is written in the form including the vertex coordinates of the polygon, and the vertex coordinate may be written with the vector from the reference coordinate. Moreover, as the form of the reference table, the geometrical pattern may be written as the set of geometrical patterns which has a partial function of the element.

Figure 12:
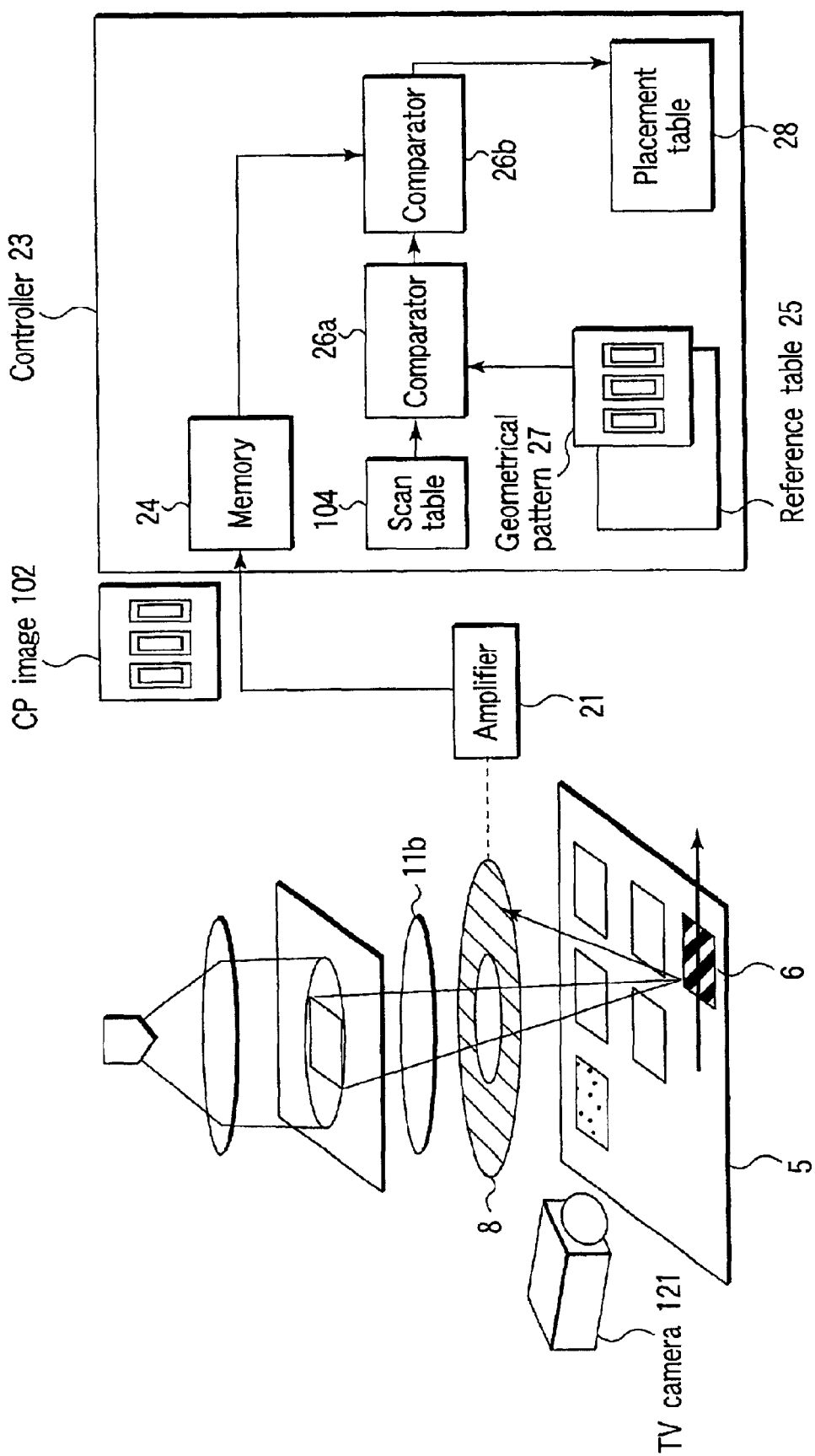
FIG. 12 is an explanatory view of a modification example of the exposure apparatus according to the sixth embodiment of the present invention.

Moreover, as shown in FIG. 12, the CP image is acquired by a TV camera 121, and the shape and position of the CP pattern may be determined by the acquired image. Thereby, a CP pattern position can coarsely be adjusted, and a high-speed and simple beam scan can be realized.

(Seventh Embodiment)

In a seventh embodiment, as means for converting a CP pattern image, a method of using a desired function to blur (gradate) the geometrical pattern of the reference table will be described with reference to FIGS. 13A and 13B.

Figure 13A:
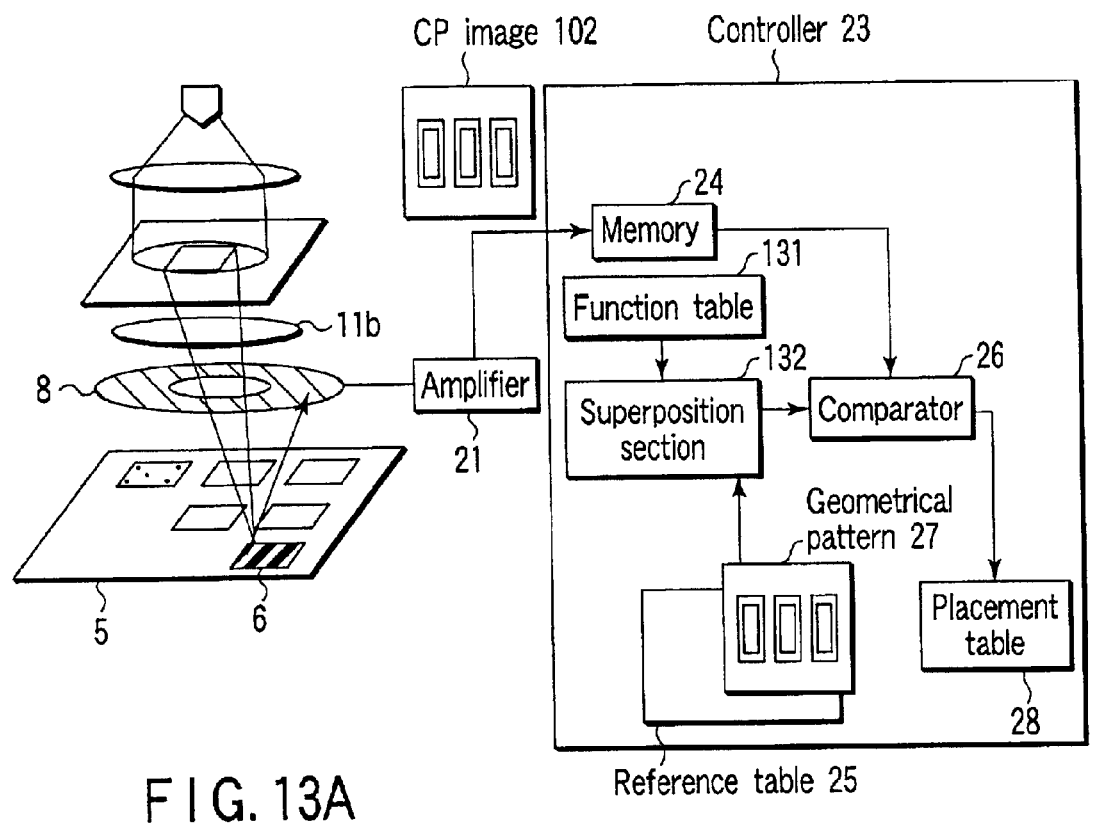
FIGS. 13A and 13B are explanatory views of the exposure apparatus according to a seventh embodiment of the present invention.
Figure 13B:
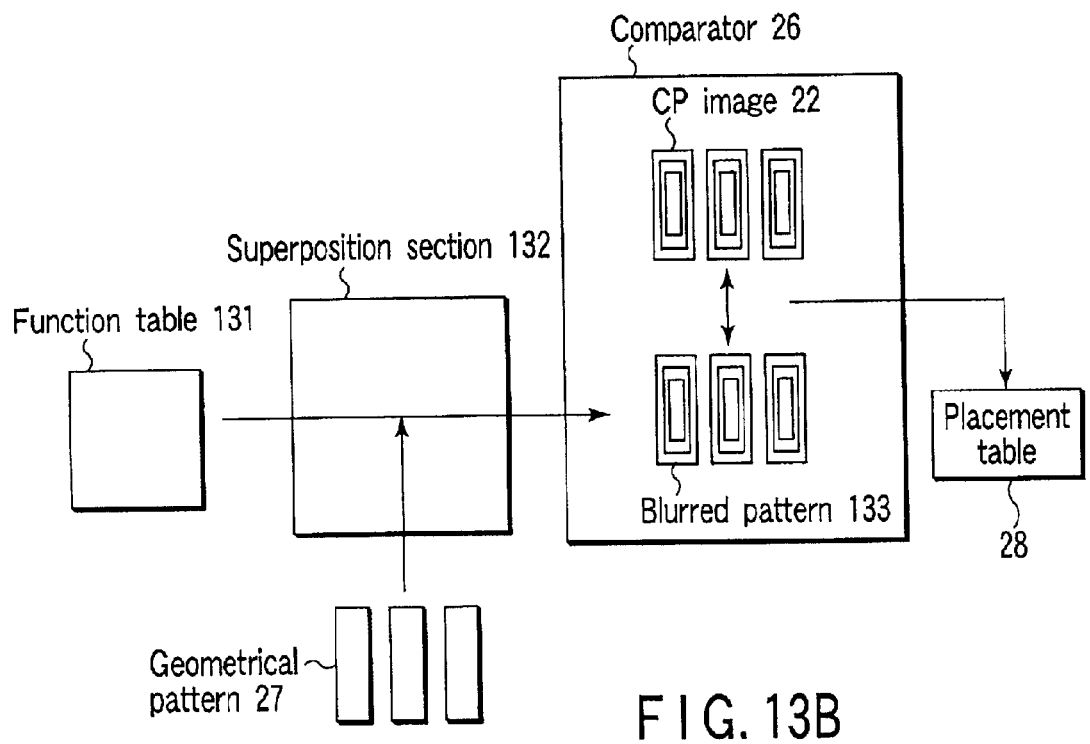

As shown in FIGS. 13A and 13B, a function table 131 is disposed as means for blurring the geometrical pattern in the exposure apparatus of the seventh embodiment. Here, a Gaussian function is used as a function for blurring the geometrical pattern.

First, a CP image 102 obtained similarly as the first embodiment is sent to the memory 24 in the controller 23. The geometrical pattern 27 from the reference table 25 in the controller 23, and a function pattern from a function table 131 are sent to a superposition section 132, respectively. The superposition section 132 uses the Gaussian function to perform superposition calculation, and prepares a blurring pattern of the geometrical pattern 27. A blurring pattern 133 from the superposition section 132, and the CP image 22 from the memory 24 are inputted to the comparator 26, and the pattern is identified by the pattern matching. The CP placement table 28 is prepared based on the identification result.

Also in the seventh embodiment, similarly as the first embodiment, the table preparing operation can be automated, and the productivity in the electron beam exposure can remarkably be enhanced. Moreover, according to the method of the seventh embodiment, a pattern matching precision can be enhanced.

Furthermore, in the seventh embodiment, after the geometrical pattern 27 is blurred by the Gaussian function, the pattern matching is performed, but another method may be used. For example, the method comprises extracting an outline of the image of the acquired CP pattern, and comparing the extracted outline data with the reference table.

Moreover, only a part of the CP pattern image may be compared with a part of the corresponding geometrical pattern. In this case, the acquired CP pattern image may be converted to a writing form of the geometrical pattern of the reference table. Additionally, during comparison of the CP pattern shape obtained by the beam scan with the geometrical pattern of the reference table, reference geometrical patterns are sorted in order from the pattern having a high matching ratio, and a characteristic portion of the sorted reference geometrical pattern may be compared with the CP pattern image. When this function is used, a high-speed pattern matching is possible.

(Eighth Embodiment)

Figure 14A:
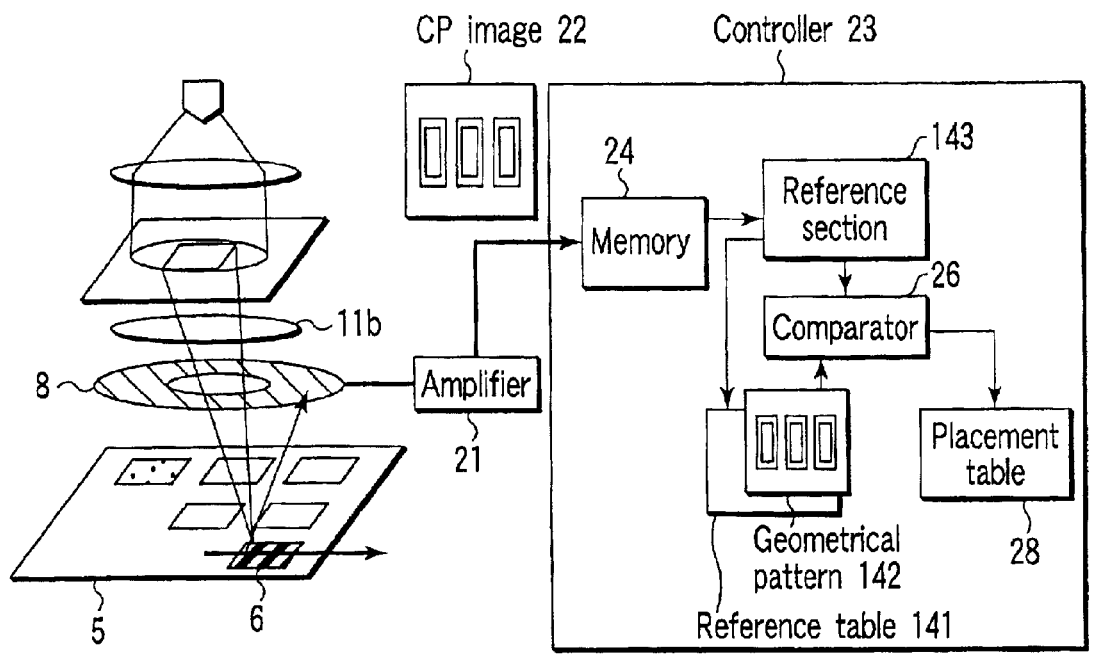
FIGS. 14A and 14B are explanatory views of the exposure apparatus according to an eighth embodiment of the present invention.

According to an eighth embodiment, in the reference table with the geometrical pattern written therein, the geometrical patterns are grouped using a pattern density as a parameter. The eighth embodiment will be described hereinafter with reference to FIGS. 14A and 14B.

Figure 14B:
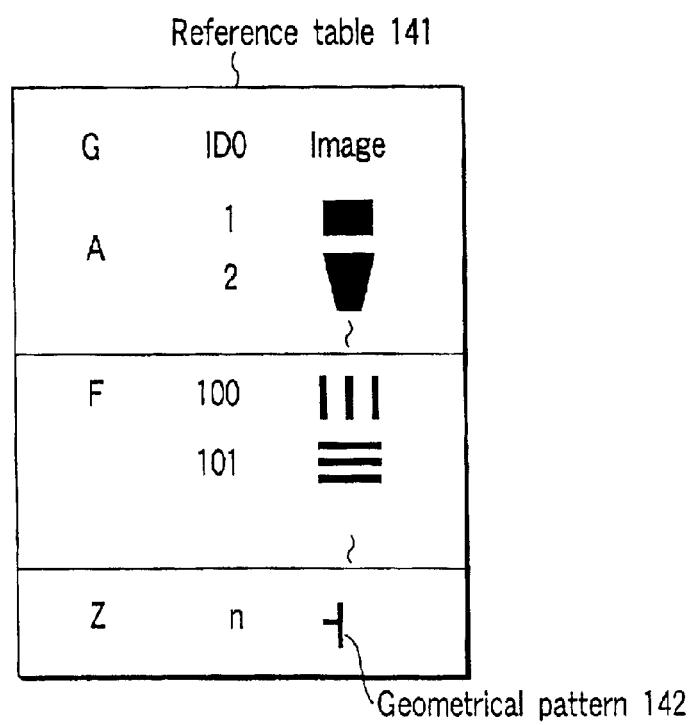

As shown in FIG. 14B, for a reference table 141 of the eighth embodiment, the geometrical patterns are grouped using the pattern density as the parameter. Here, the geometrical patterns are grouped from group A to group Z in order from a large pattern density. The group A includes a geometrical pattern 142 having a pattern density of 80% or more, and the group Z includes the geometrical pattern 142 having a pattern density of 5% or less.

First, the CP image 22 obtained similarly as the first embodiment is sent to a reference section 143 via the memory 24. The reference section 143 obtains the pattern density of the CP image 22, and sends pattern density information to the reference table 141. In the reference table 141, the geometrical patterns are grouped for each pattern density based on the information from the reference section 143, and information of the grouped geometrical pattern 142 is sent to the comparator 26. The comparator 26 identifies the information of the grouped geometrical pattern 142 from the reference table 141, and the CP image 22 from the reference section 143 by pattern matching. Furthermore, the CP placement table 28 is prepared based on the judgment result.

Also in the eighth embodiment, similarly as the first embodiment, the table preparing operation can be automated, and the productivity in the electron beam exposure can remarkably be enhanced. Moreover, according to the method of the eighth embodiment, pattern matching speed and precision can be enhanced.

Additionally, in the eighth embodiment, in the reference table, the geometrical patterns are grouped using the pattern density as the parameter, but another method may be used. For example, the geometrical patterns in the reference table may be grouped using the number of vertexes and vertex coordinate as parameters. Moreover, the geometrical patterns in the reference table may be grouped using vector direction or number as the parameter. Furthermore, the geometrical patterns in the reference table may be grouped using the type, the number, or the placement of the basic geometrical patterns as the parameter.

(Ninth Embodiment)

Figure 15A:
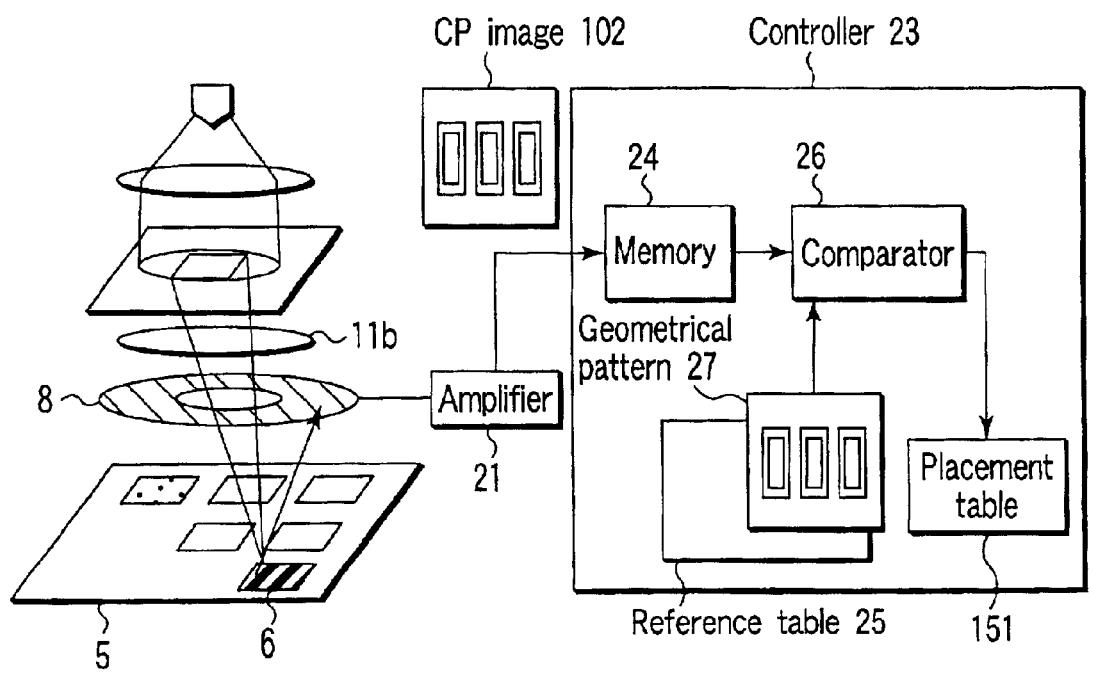
FIGS. 15A and 15B are explanatory views of the exposure apparatus according to a ninth embodiment of the present invention.

In a ninth embodiment, the placement table is corrected based on information of the identified geometrical pattern. The ninth embodiment will be described with reference to FIG. 15A and FIG. 15B.

First, the CP image 22 obtained similarly as the first embodiment is sent to the memory 24 in the controller 23. The reference table 25 is prepared beforehand in the controller 23. The CP image 102 stored in the memory 24, and the geometrical pattern 27 from the reference table 25 are sent to the comparator 26. The comparator 26 compares/identifies the geometrical pattern 27 with the CP image 22 by pattern matching.

Figure 15B:
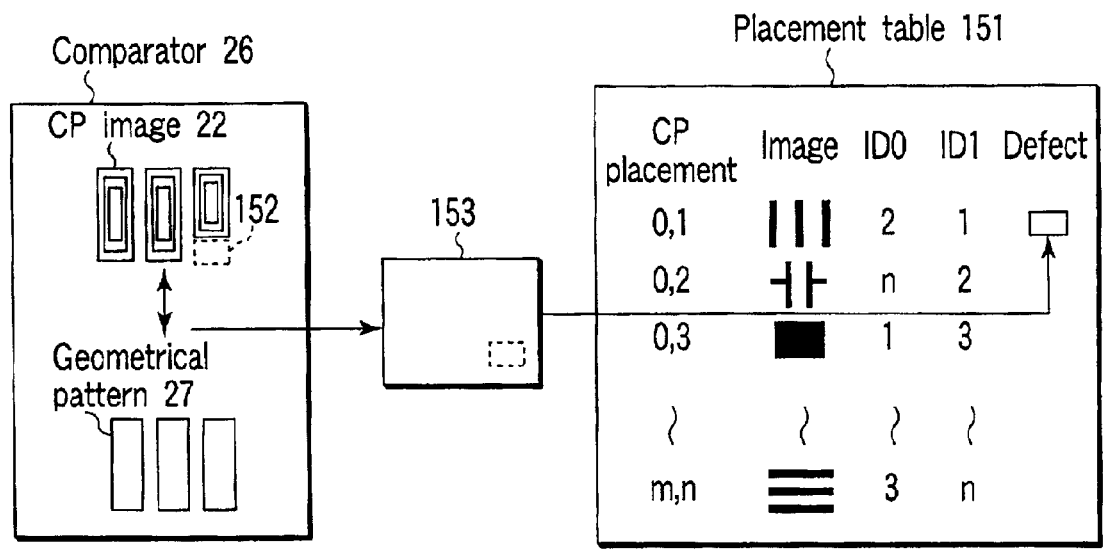

A placement table 151 is prepared based on a comparison result in the comparator 26. In this case, as shown in FIG. 15B, defect information 153 (information of an insufficient pattern) of a portion 152 in which the pattern is not matched is added to the CP placement table 151. Here, a defect is generated in the CP pattern, and size and position of a pattern for compensating for the defect are written in the defect information 153.

Figure 16:
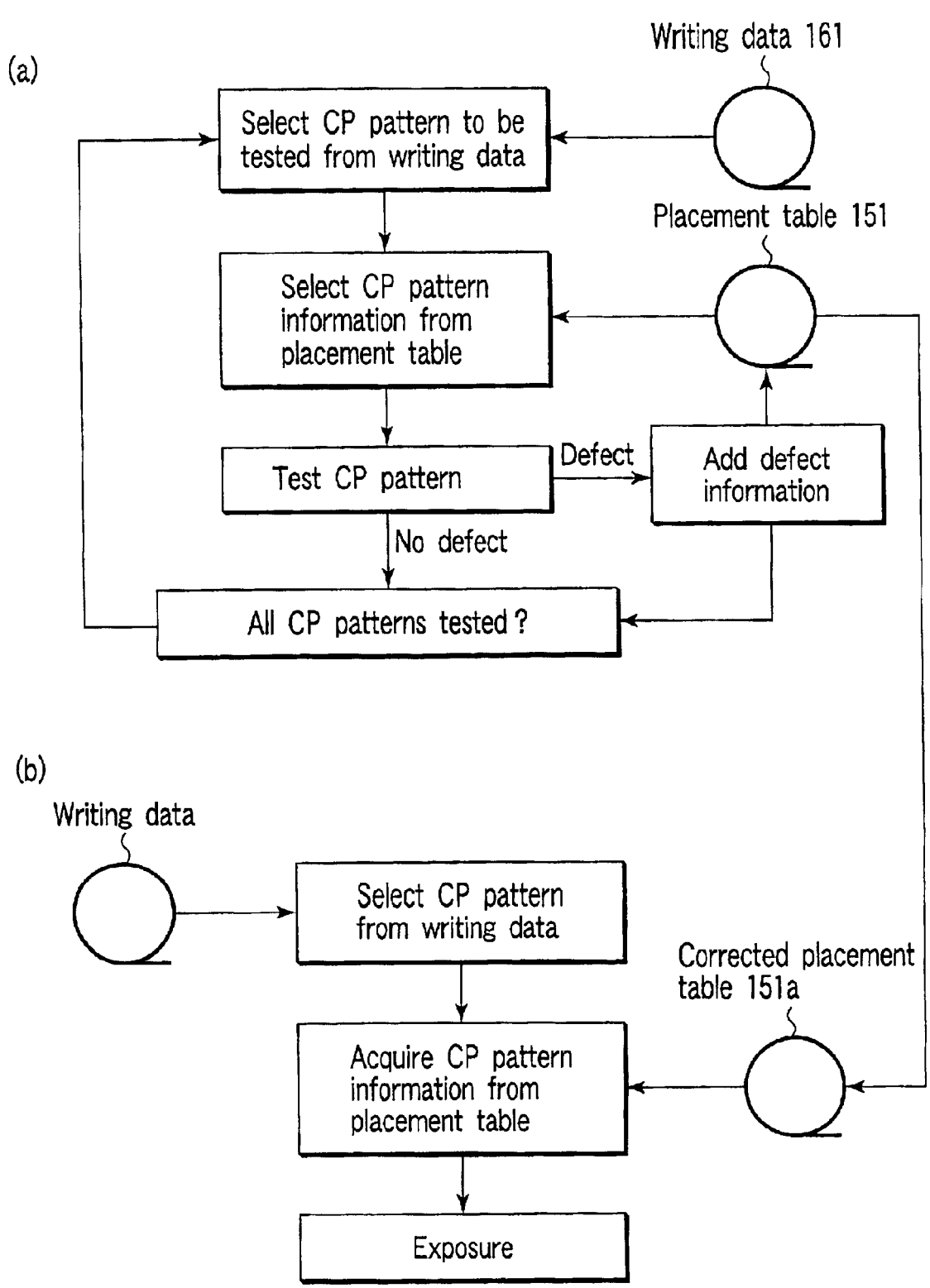
FIG. 16 is a diagram showing a flow of a defect correcting method in the exposure apparatus according to the ninth embodiment of the present invention.

An exposure method of the present embodiment will next be described with reference to FIG. 16.

First, a CP pattern to be tested is selected based on writing data 161. Subsequently, CP pattern information is acquired from the prepared placement table 151. The CP pattern is tested based on the acquired CP pattern information. A test method is described above.

When there is a defect in the tested CP pattern, defect information is added to the CP placement table 151. That is, as shown in FIG. 15B, when there is insufficient pattern in the CP pattern, compensation pattern is added as the defect information 153.

Figure 17A:
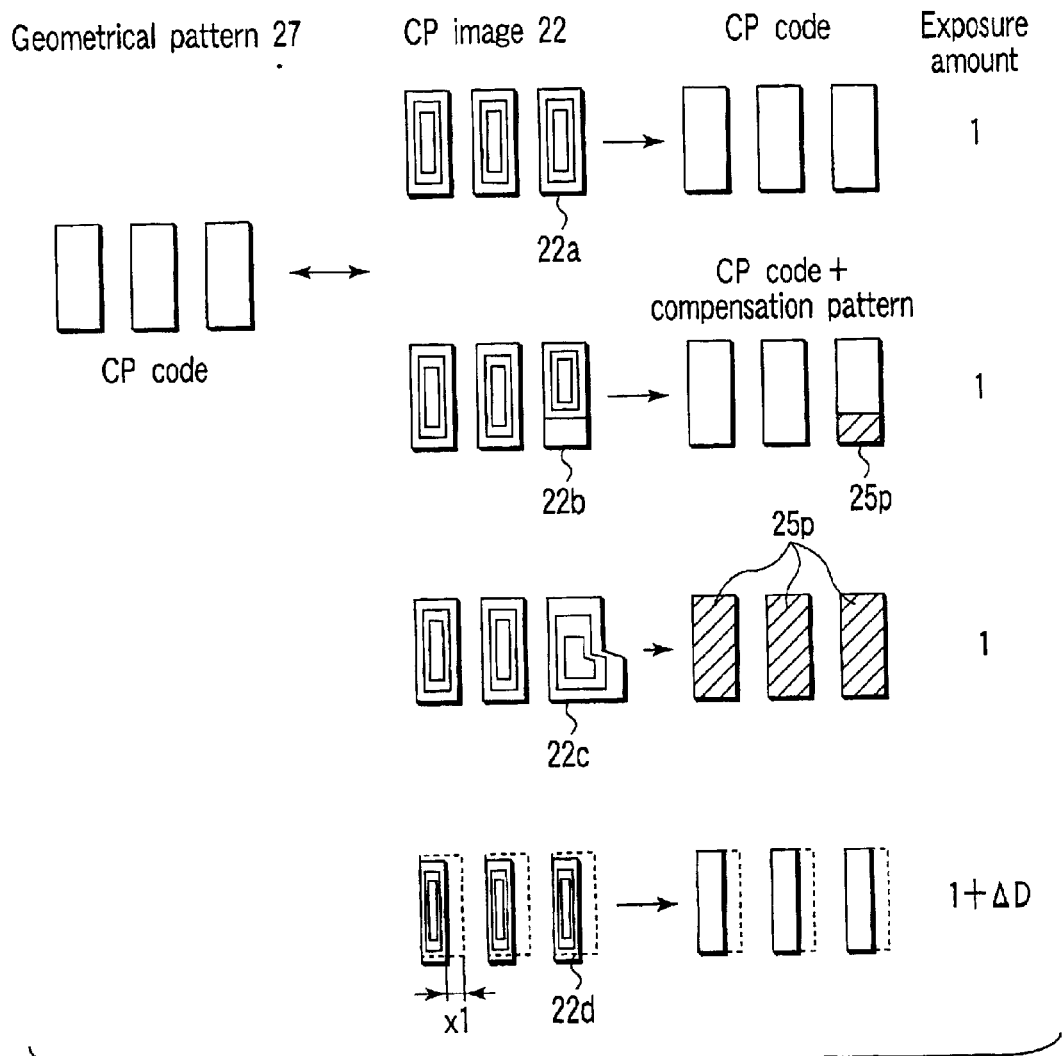
FIGS. 17A and 17B are diagrams showing a concrete example of the defect correcting method in the exposure apparatus according to the ninth embodiment of the present invention.

On the other hand, when there is an excess pattern in the CP pattern as shown in FIG. 17A, such pattern 22c is not used. In this case, VSB exposure data 25p is prepared instead of the pattern 22c, and written in the CP placement table 151.

Figure 17B:
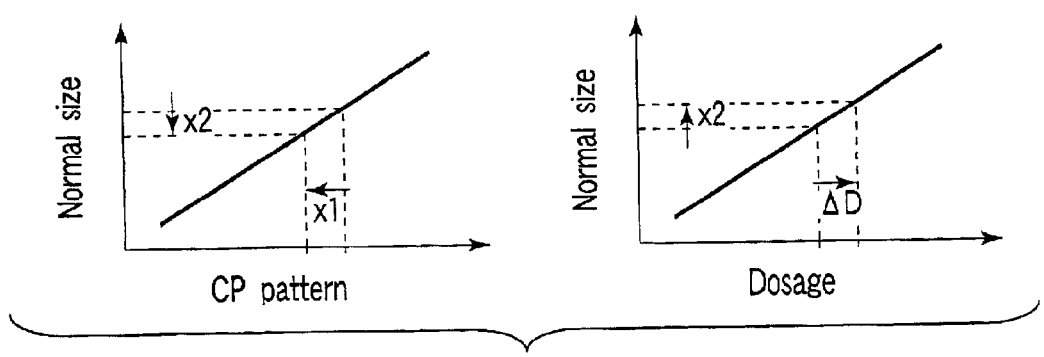

When there is no defect in a tested CP pattern 22a (the pattern agrees with the geometrical pattern 27), an exposure amount has a set value (e.g., 1). When a CP image 22d is smaller than a desired size (normal size), a dosage change $\Delta D$ is added to the set exposure amount in order to compensate for a size change. As shown in FIG. 17B, the compensation exposure amount can be obtained by preparing a relation between a CP pattern size and dosage.

When the aforementioned process is performed with respect to all CP patterns included in writing data 161, a CP placement table 151a with defect information 153 added thereto can be obtained.

The exposure method using the CP placement table 151a obtained in this manner will next be described with reference to FIG. 16 and FIGS. 18A to 18C.

Figures 18A, 18B, 18C:
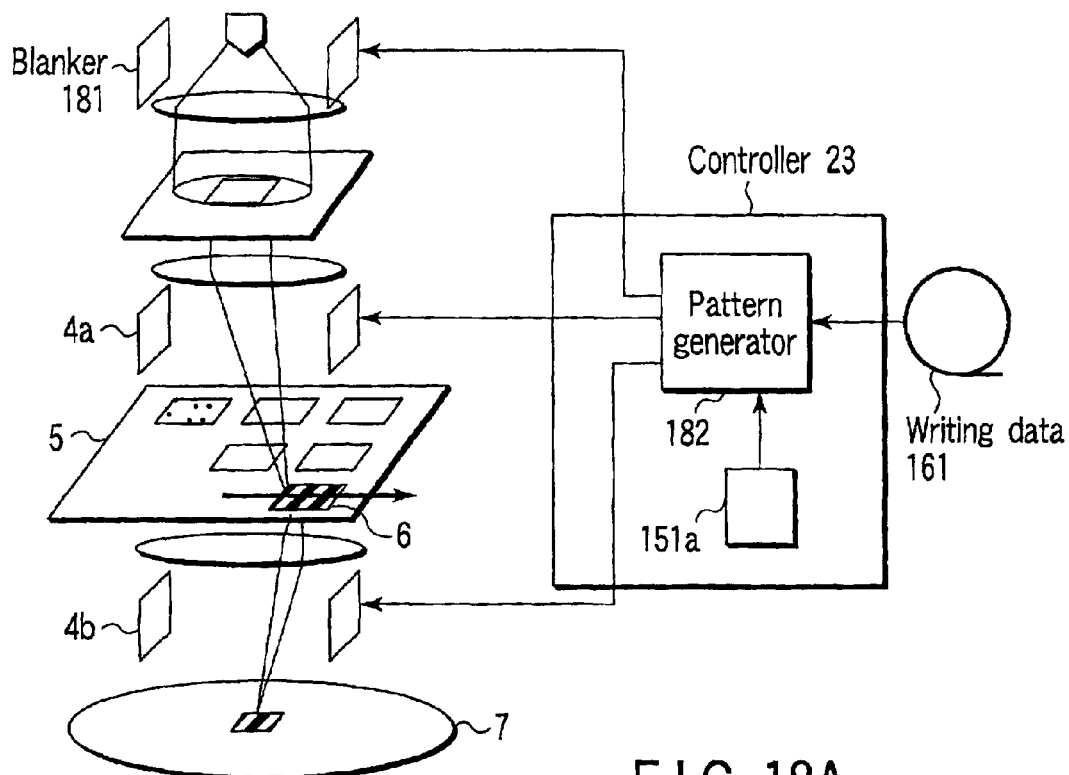
FIGS. 18A to 18C are explanatory views of the exposure apparatus according to the ninth embodiment of the present invention.

CP pattern information is read from the CP placement table 151a based on the writing data 161. As shown in FIG. 18A, a pattern generator 182 in the controller 23 controls a blanker 181 and deflectors 4a and 4b based on the CP pattern information, and exposure is performed. For example, when defect information is added to CP placement (0, 1), and when such pattern is read, VSB data is read to perform exposure, or the blanker 181 is controlled to change the exposure amount.

As described above, according to the present embodiment, the information on the character projection pattern is compared with the information on the reference pattern, and the shape of the character projection pattern is identified, so that the defect of the CP pattern can be tested. Therefore, during exposure, exposure failure can be eliminated by not using the CP pattern having the defect, substituting another pattern, or taking another measure. As a result, the productivity in charged beam exposure can be enhanced.

Additionally, in the present embodiment, the exposure amount is determined based on a deviation amount from the size of the CP pattern written in the reference table or the desired size in order to correct or compensate for size deviation, but another method may also be used. For example, an auxiliary pattern may be included in the exposure data in order to correct or compensate for the size deviation based on the deviation amount from the size of the CP pattern written in the reference table or the desired size.

Moreover, in the present embodiment, the method of reading the geometrical pattern during exposure based on the corrected placement table has been described, but the writing data itself may be changed.

The apparatus and method described above can be applied to a manufacturing method of a semiconductor devise as follows. Firstly, a semiconductor substrate having a resist film formed thereon is prepared. The resist film causes a reaction by irradiation of the charged beam. Then the character projection pattern is projected to the resist film by using the apparatus. Subsequent processes (developing process and etching process, etc.) are followed by known techniques.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exposure apparatus for a charged particle beam, comprising:
    a pattern information acquiring section acquiring information on a character projection pattern formed in a character projection aperture mask;
    a first information storing section storing a plurality of pieces of information on reference patterns; and
    an identifying section identifying a shape of the character projection pattern as a shape of one of the reference patterns by comparing the information on the character projection pattern with the pieces of information on the reference patterns.

2. The apparatus according to claim 1, further comprising a pattern information generating section generating information on a shape and a placement of the character projection pattern based on information on the identified shape of the character projection pattern.

3. The apparatus according to claim 2, further comprising a second information storing section storing the information on the shape and the placement of the character projection pattern generated by the pattern information generating section.

4. The apparatus according to claim 1, further comprising a pattern information correcting section correcting the information on the reference pattern based on information on the identified shape of the character projection pattern.

5. The apparatus according to claim 4, further comprising a second information storing section storing information on the reference pattern corrected by the pattern information correcting section.

6. The apparatus according to claim 1 wherein the information on the character projection pattern is acquired by detecting a reflection electron, a secondary electron, or a transmission electron of the charged beam with which the character projection aperture mask is irradiated.

7. The apparatus according to claim 1 wherein the information on the character projection pattern is acquired by imaging the character projection pattern formed in the aperture mask.

8. An exposure method for a charged beam, comprising:
    acquiring information on a character projection pattern formed in a character projection aperture mask; and
    identifying a shape of the character projection pattern as a shape of one of a plurality of reference patterns by comparing the information on the character projection pattern with a plurality of pieces of information on the reference patterns.

9. The method according to claim 8, further comprising generating information on a shape and a placement of the character projection pattern based on information on the identified shape of the character projection pattern.

10. The method according to claim 9, further comprising storing the information on the shape and the placement of the character projection pattern.

11. The method according to claim 8, further comprising correcting the information on the reference pattern based on information on the identified shape of the character projection pattern.

12. The method according to claim 11, further comprising storing the corrected information on the reference pattern.

13. The method according to claim 8 wherein the information on the character projection pattern is acquired by detecting a reflection electron, a secondary electron, or a transmission electron of the charged beam with which the character projection aperture mask is irradiated.

14. The method according to claim 8 wherein the information on the character projection pattern is acquired by imaging the character projection pattern formed in the aperture mask.

15. A manufacturing method of a semiconductor device comprising:
    acquiring information on a character projection pattern formed in a character projection aperture mask;
    identifying a shape of the character projection pattern as a shape of one of a plurality of reference patterns by comparing the information on the character projection pattern with a plurality of pieces of information on the reference patterns;
    preparing writing data based on information on the identified shape of the character projection pattern;
    generating a charged particle beam based on the writing data; and
    exposing a resist film formed on a semiconductor substrate by the charged particle beam.

* * * * *